M. P. BOWMAN,

Assignor, by mesne assignments, to F. I. MARCY.

FASTENING FOR SLEEVE BUTTONS AND STUDS.

No. 9,973. Reissued Dec. 13, 1881.

WITNESSES:

Wm. L. Coop,

Joseph A. Miller Jr

INVENTOR:

Morris P. Bowman by Joseph A. Miller atty

N. PETERS, Photo-Lithographer, Washington, D. C.

UNITED STATES PATENT OFFICE.

MORRIS P. BOWMAN, OF YOUNGSTOWN, OHIO, ASSIGNOR, BY MESNE ASSIGNMENTS, TO FREDERICK I. MARCY, OF PROVIDENCE, RHODE ISLAND.

FASTENING FOR SLEEVE-BUTTONS AND STUDS.

SPECIFICATION forming part of Reissued Letters Patent No. 9,973, dated December 13, 1881.

Original No. 183,893, dated October 31, 1876. Application for reissue filed October 6, 1881.

*To all whom it may concern:*

Be it known that I, MORRIS P. BOWMAN, of Youngstown, in the county of Mahoning and State of Ohio, have invented certain new and useful Improvements in Fastenings for Sleeve-Buttons and Studs, &c.; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to sleeve and collar buttons, shirt-studs, and other like articles of ornament and use for connecting the parts of garments.

The invention consists in a new and improved fastening device by means of which the comparatively large button-holes heretofore necessary may be dispensed with and the button or stud be inserted in the required position easily and quickly, be securely held in place, and be removed or detached, when required, with facility, all as hereinafter set forth.

Figure 2:
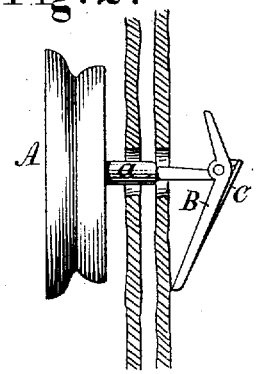
Figure 1:
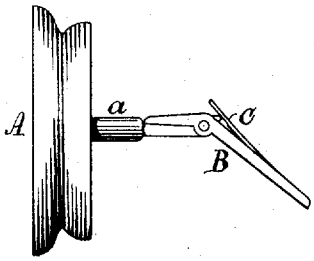
Figure 3:
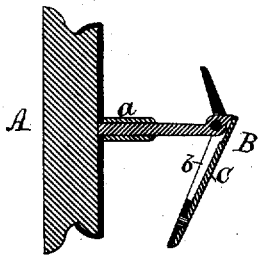
Figure 4:
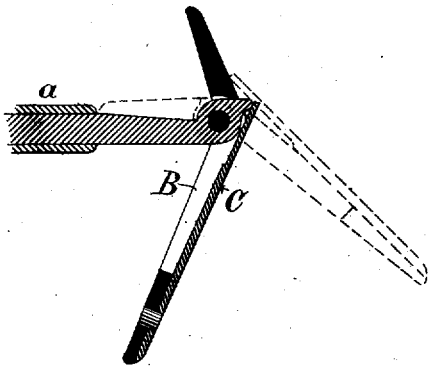

In the accompanying drawings, Figure 1 is a side elevation of a sleeve-button having my improved fastening device, shown extended or in position ready to be inserted in place. Fig. 2 is a similar view, showing the button secured in position. Fig. 3 is a sectional view, showing the construction and arrangement of the parts of the device. Fig. 4 is an enlarged sectional view of the fastening device and part of the standard.

Referring to the parts by letters, A represents a sleeve-button, on the back of which, and projecting from its central portion, is a plate or fixed standard, *a*.

B is a guard-bar (or, as is usually termed in the art, the "shoe") hinged to the end of the standard *a*. This guard-bar or shoe is formed with a longitudinal slot, *b*, in which a spring-bar, C, is inserted, the outer end of the spring being secured to the outer end of the bar or shoe B, and its other or free end resting on and bearing against the end of the post, which forms the stationary part of the hinge. The inner or short end of the bar or shoe B is slightly curved or bent inwardly, so as not to catch while the button is being placed in position or withdrawn therefrom.

With a button of this description it will be seen that the spring C, bearing against the end of the post, will keep the guard-bar or shoe B in position, either extended, as shown in Figs. 1 and 3, or turned laterally, as shown by Fig. 2 of the drawings, a certain degree of force being required to turn the bar or shoe in either direction.

When it is desired to place the button in position the bar or shoe B is extended, and can then be easily passed through narrow slits or openings in the garment to be fastened. The guard-bar or shoe B is then turned on its hinge, when its projecting ends will extend beyond the holes or openings in the garment and securely hold the button in position. By again turning the bar or shoe B into its extended position the button can be removed without difficulty.

The advantages resulting from the use of my improved fastening device will be apparent to any one who has suffered loss or inconvenience through the use of the old style of button, which soon enlarges the button-holes and drops out or fails of its office.

With a button or stud having my improvement only a small hole or narrow slit requires to be made in the garment, there is no difficulty in placing the button in position, and when the guard-bar or shoe is turned laterally its ends project so far beyond the slits or openings that the button cannot become detached or drop out.

It will also be seen that while the spring, by always bearing against a stationary post and the bar or shoe with pressure, retains the bar or shoe B in either position, as hereinbefore set forth, yet, by its being made as described and inserted within the slot in the bar or shoe, it does not take up any extra space or project so as to catch or tear the garment, and does not necessitate the use of any larger hole being made in the garment than is required for the passage of the bar or shoe B itself.

Fig. 4 shows a projection of the standard, forming a corner on which the spring C bears, and Fig. 1 shows that the spring is raised off from the bar or shoe B farther when in this position than in any other. By this device I therefore obtain a constant pressure to retain the bar or shoe B in any desired position without increasing the size of the fastening device. To firmly hold the shoe in the locked position, the spring C bears on a corner or projection of the post or standard *a*, as is clearly shown in all the figures, but more particularly in Fig. 4, and in turning the shoe on the hinge considerable force is required to move the shoe from the locked to the unlocked position, as the strain on the spring is increased in so turning the shoe. By thus forming an angular or projecting bearing the shoe is retained by the tension of the spring in the locked position, and is not liable, in ordinary wear, to become unlocked.

Having thus described my invention, I claim as new and desire to secure by Letters Patent—

1. The herein-described button-fastening device, consisting of the bar or shoe B, hinged to the standard *a* and having the slot *b*, in which the spring C is secured, so that its free end rests upon and bears against the end of the post, substantially as and for the purpose specified.

2. The combination, in a stud or button, of a shoe hinged to a fixed post projecting from the rear of the button, and a spring bearing on an angular portion of the post so as to retain the shoe in either a locked or unlocked position, as described.

3. The combination, with the post of a button or stud, of a shoe hinged to said post and arranged to be turned to permit the insertion of the post into a button-hole and to prevent its withdrawal therefrom, and a spring arranged to press upon said shoe, and also upon a stationary abutment of the post, and hold the said shoe in both of its ultimate positions.

In witness whereof I have hereunto affixed my name.

MORRIS P. BOWMAN.

Witnesses:
MASON EVANS,
L. LIEBMAN.